United States Patent [19]

May

[11] 4,037,924
[45] July 26, 1977

[54] RETROREFLECTIVE MARKER DEVICES FOR ATTACHMENT TO SPOKES OF BICYCLE WHEELS OR THE LIKE

[75] Inventor: Louis May, Skokie, Ill.
[73] Assignee: Sate-lite Mfg. Co., Harwood Heights, Ill.
[21] Appl. No.: 588,731
[22] Filed: June 20, 1975
[51] Int. Cl.² .............................................. G02B 5/12
[52] U.S. Cl. .................................... 350/97; 74/594.4; 301/37 SA; 350/99
[58] Field of Search .................. 350/99, 116, 299, 97, 350/77; 301/37 SA; 280/432; 74/594.4

[56] References Cited

U.S. PATENT DOCUMENTS

| 3,820,852 | 6/1974 | Kennedy | 301/37 SA |
|---|---|---|---|
| 3,854,777 | 12/1974 | Kennedy | 301/37 SA |
| 3,901,554 | 8/1975 | Kennedy et al. | 350/99 |
| 3,950,076 | 4/1976 | Carlson | 350/97 |

Primary Examiner—John K. Corbin
Assistant Examiner—B. Wm. delos Reyes
Attorney, Agent, or Firm—Burmeister, York, Palmatier, Hamby & Jones

[57] ABSTRACT

Marker devices are disclosed in the form of reflex reflectors or the like, for attachment to the spokes of bicycle wheels or the like. In several embodiments, the marker device includes a marker member having seat means for receiving one of the spokes, so that the marker member will be maintained in the desired orientation by the spoke. The marker member is preferably supplied with clamping means for clamping the seat means against the spoke. The length of the marker member is preferably at least twice the spacing between the adjacent spokes, so that the position of the marker member will be stabilized by engagement with the adjacent spokes on both sides of the spoke to which the marker member is secured. The seat means may comprise a groove, formed in the marker member, for receiving the spoke. The seat means may also comprise one or more wall elements on the marker member. In certain embodiments, the clamping means includes a clamping screw which is engageable with the spoke. In certain embodiments, the marker member comprises a pair of reflex reflector plates secured together back to back. In certain other embodiments, the clamping means may include a rotatable cam or eccentric, operable by a screw driver or a lever. In another embodiment, the clamping means may take the form of a wedge block, slidable into a locking position on the marker member.

12 Claims, 23 Drawing Figures

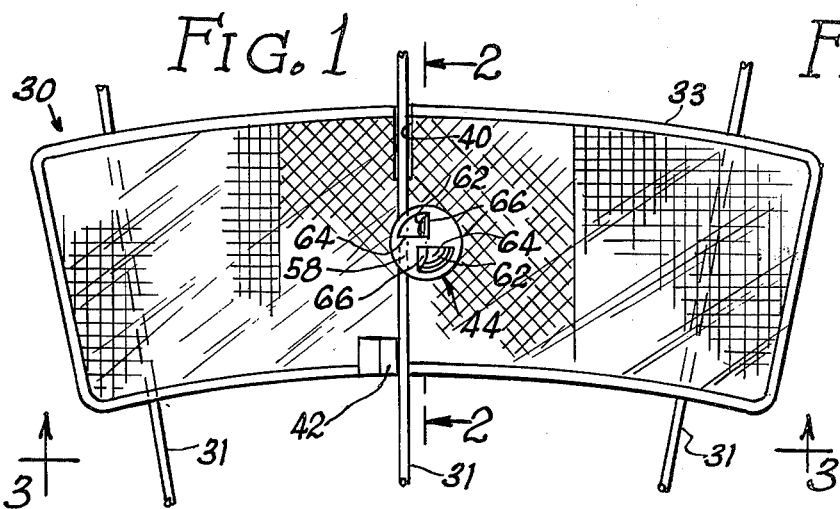
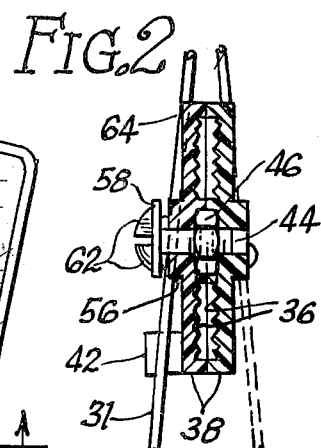
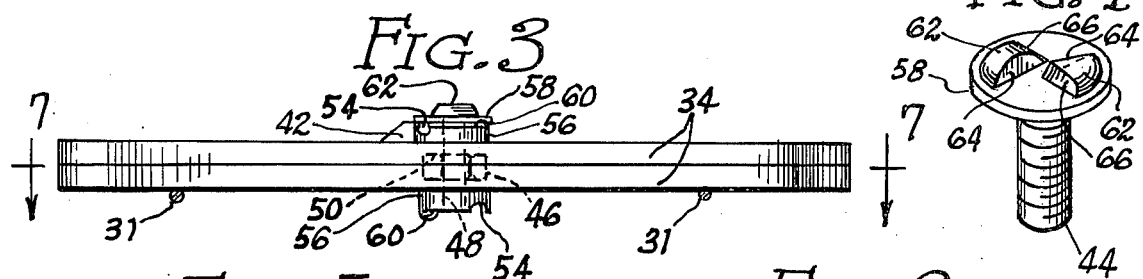
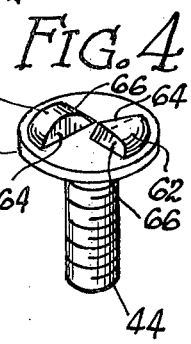
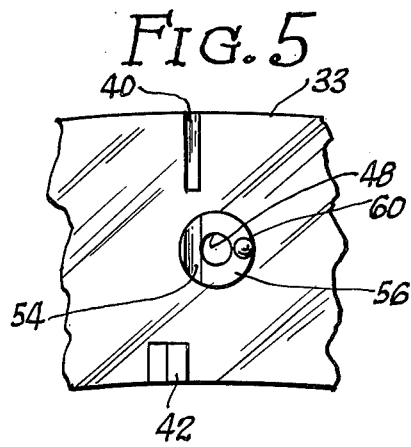
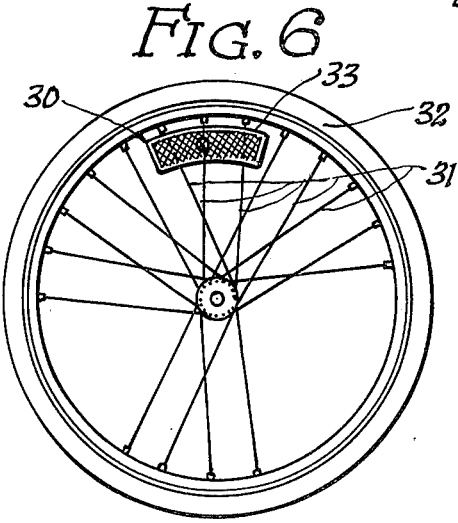
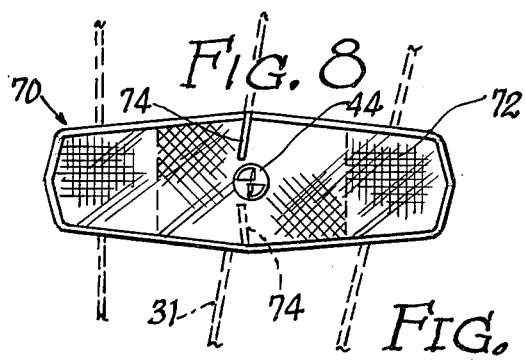
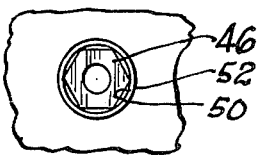
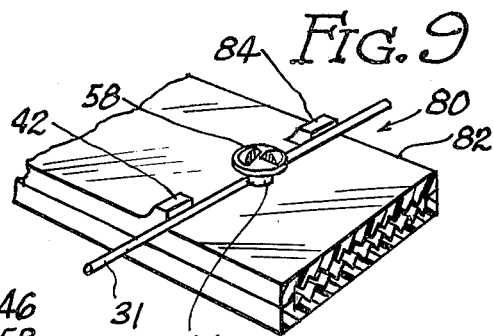

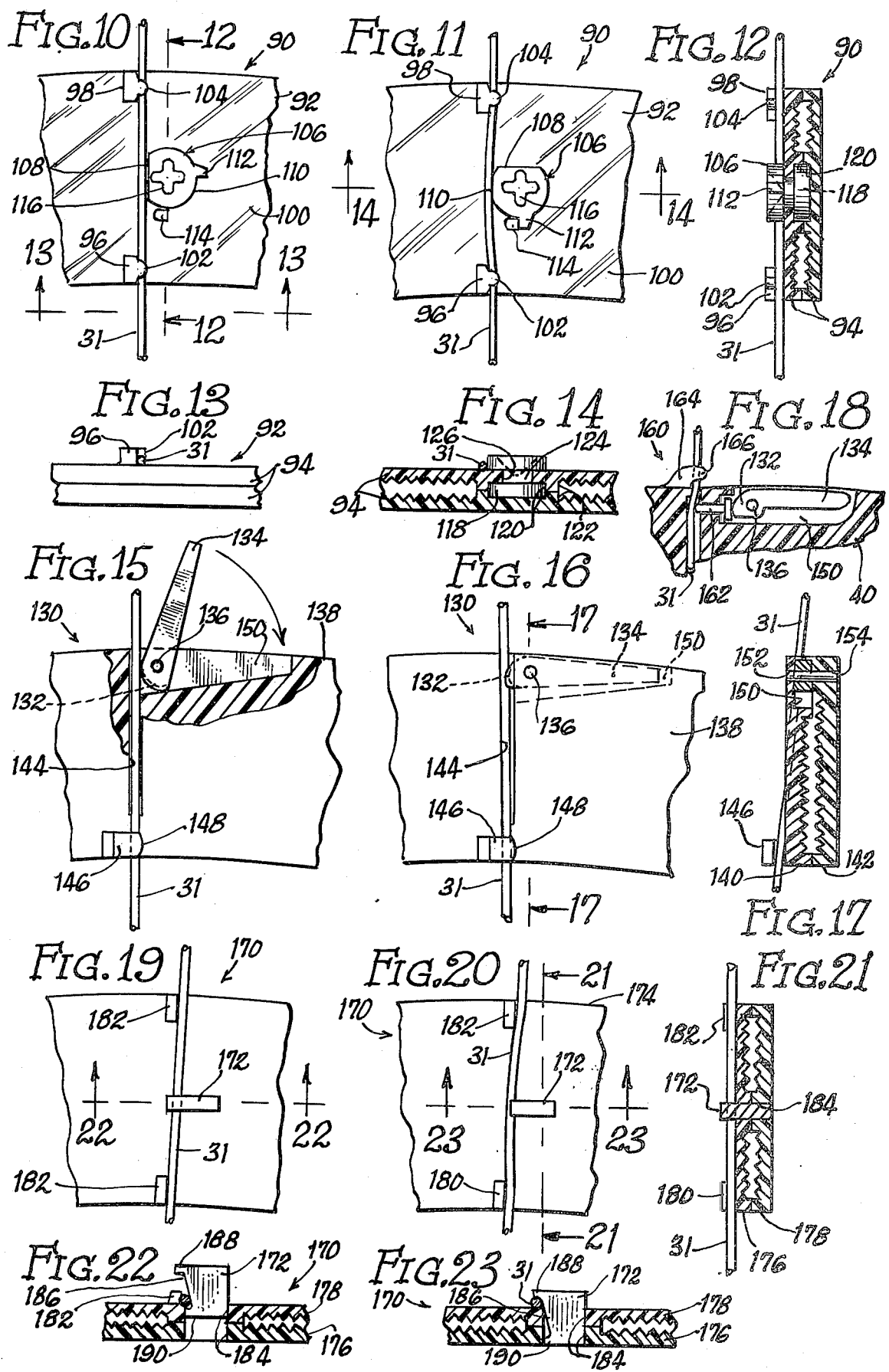

RETROREFLECTIVE MARKER DEVICES FOR ATTACHMENT TO SPOKES OF BICYCLE WHEELS OR THE LIKE

This invention relates to marker devices, such as reflux reflectors, intended particularly for attachment to bicycle wheels.

The attachment of reflex reflectors to bicycle wheels provides markers which are clearly visible at night by the reflected light of automobile headlights, so that bicycle riders can travel with increased safety after dark. The rotation of the bicycle wheels, coupled with the movement of the bicycle along the ground, causes the reflex reflectors to move along a cycloidal path, with the result that the reflectors are strikingly visible. Safety standards have been issued that would require new bicycles to be equipped with reflex reflectors, mounted on the wheels of the bicycles.

One object of the present invention is to provide new and improved marker devices having means for securely attaching reflex reflectors or other marker members to the spokes of bicycle wheels, in such a manner that the reflectors will remain securely mounted on the spokes, despite the vibration and shock to which the bicycle wheels are subjected during normal use.

A further object is to provide new and improved marker devices which are easy to mount in a secure manner on the spokes of bicycles, yet are difficult to remove, so that the possibility of loss or theft of the marker devices will be minimized.

Another object is to provide marker devices which can easily be installed on the spokes of bicycle wheels with the simplest of tools, or even with no tools at all.

To accomplish these objects, the present invention may provide marker devices comprising relfex reflectors or other marker members adapted to be clamped to the spokes of bicycle wheels or the like. Each member may have a seat for receiving and locating one of the spokes. In this way, the marker member is oriented in a particular position on the spoke. The marker member is also provided with clamping means for clamping the marker member against the spoke, with the spoke securely clamped into the seat. The length of the marker member is preferably at least twice the spacing between the spokes, so that the marker member will engage the two adjacent spokes which are closest to the spoke to which the marker member is clamped. In this way, the marker member is prevented from rotating about the spoke to which it is clamped.

The seat on the marker member may take the form of one or more grooves adapted to receive one of the spokes. In other embodiments, the seat may be formed by wall elements or lugs projecting from the marker member.

In certain embodiments, the clamping means may comprise a clamping screw having a head adapted to engage the spoke and to produce clamping pressure between the spoke and the seat. Thehead of the screw is preferably formed with one-way drive elements which may be engaged by a screwdriver for use in tightening the screw, but which do not provide any assistance for loosening the screw. The one-way drive elements may include cams over which the screwdriver slides idly, if an attempt is made to loosen the screw.

The marker member may comprise a pair of rectroreflective plates secured together back to back. A nut for receiving the screw may be retained between the two plates, which may be formed with complementary sockets for receiving the nut. The retroreflective plates may be of the type having cube corner prism facets on its rear side. By securing two plates together back to back, by welding or adhesive means, the prism facets can be hermetically sealed, so that they will not be affected by moisture or dirt.

In other embodiments, the clamping means may include a rotatable cam or eccentric which is mounted on the marker member and is adapted to be rotated by a screwdriver or a lever, formed integrally with the cam. In this cam, the cam or eccentric is adapted to apply clamping force to the spoke so that it will be clamped against its seat on the marker member. The rotatable cam may have a rotatable mounting member which is retained between the two plates of the reflex reflector.

In certain embodiments, the clamping means may be arranged to engage the spoke at a point disposed between two spaced elements which form the seat for the spoke. The arrangement may be such that the spoke is free to flex between such elements. For this construction, the clamping means will produce flexure of the spoke between the seat elements.

In certain embodiments, the clamping means may comprise a wedge member which is slidably mounted on the marker member and is adpated to apply clamping force aganst the spoke. The wedge member may be in the form of a wedge block which is slidable in an opening in the marker member. The wedge member has the advantage that it cam be moved into its locking position without the use of tools. This advantage is also shared by the cam type clamping member having an integral lever.

Further objects, advantages and features of the present invention will appear from the following description, taken with the accompanying drawing, in which:

FIG. 1 is an elevational view showing a marker device in the form of a reflex reflector, to be described as an illustrative embodiment of the present invention, the marker device having shown in its position of use, attached to a spoke of a bicycle wheel or the like.

FIG. 2 is a transverse section, taken generally along the line 2—2 in FIG. 1.

FIG. 3 is an edge view, taken generally as indicated by the line 3—3 in FIG. 1.

FIG. 4 is a perspective view showing the clamping screw employed in the marker device of FIGS. 1—3.

FIG. 5 is a fragmentary elevation, similar to the central portion of FIG. 1, but with the clamping screw and the spoke removed.

FIG. 6 is an elevational view on a smaller scale, showing the complete bicycle wheel with the marker device mounted on one of the spokes of the wheel.

FIG. 7 is a fragmentary elevational view showing one of the complementary socket elements for retaining the nut which receives the clamping screw of FIGS. 1–4, the view being taken generally as indicated by the line 7—7 in FIG. 3.

FIG. 8 is an elevational view similar to FIG. 1 but showing a modified construction.

FIG. 9 is a perspective view showing another modified construction.

FIG. 10 is a fragmentary elevation, similar to FIG. 1 but showing a modified marker device employing a rotatable cam as the clamping element, the cam being shown in its initial position, before the marker device is clamped to the spoke.

FIG. 11 is a view similar to FIG. 10 but showing the cam in its clamping position.

FIG. 12 is a transverse section, taken generally along the line 12—12 in FIG. 10.

FIG. 13 is an edge view, taken generally along the line 13—13 in FIG. 10.

FIG. 14 is a sectional view, taken generally along the line 14—14 in FIG. 11.

FIG. 15 is an elevational view, similar to FIG. 1 but showing another modified construction employing a lever-operated cam as the clamping element, the cam being shown in its released position.

FIG. 16 is a view simiilar to FIG. 15, but showing the cam in its clamping position.

FIG. 17 is a transverse section, taken generally along the line 17—17 in FIG. 16.

FIG. 18 is a fragmentary view similar to FIG. 15 but showing a modified construction.

FIG. 19 is an elevational view similar to FIG. 1 but showing a modified marker device employing a wedge member as the clamping element.

FIG. 20 is a view similar to FIG. 19, but showing the wedge element in its clamping position.

FIG. 21 is a transverse section, taken generally along the line 21—21 in FIG. 20.

FIG. 22 is a sectional view taken generally along the line 22—22 in FIG. 19 and showing the wedge member in its released position.

FIG. 23 is a sectional view taken generally along the line 23—23 in FIG. 20 and showing the wedge member in its clamping position.

As just indicated, FIGS. 1-6 illustrate a marker device 30 adapted to be mounted on one of the wire spokes 31 of a bicycle wheel 32 or the like. The illustrated marker device 30 comprises a marker member in the form of a reflex reflector 33 which may comprise two retroreflective plates 34, secured together back to back. The plates 34 are of the type having cube corner prism facets 36 formed on their rear sides. These cube corner facets produce total internal reflection of any light which impinges upon the front of the plate, throughout a wide angle of incidence. The illustrated reflective plates 34 have rearwardly projecting perimeter flanges 38 which are preferably welded or otherwise heremetically sealed together, so that the cube corner facets 26 are protected against any exposure to moisture or dirt. The flanges 38 may be welded together by the use of ultrasonic welding, or by the use of heat or a welding solvent. The flanges 38 may also be adhesively sealed together.

The use of the two retroreflective plates 34, secured together back to back, produces a double sided reflex reflector which reflects light impinging upon both sides of the reflector, so that it serves as a marker device for both sides of the bicycle.

The marker member 33 is securely mounted on one of the spokes 31, so that the marker device rotates with the bicycle wheel 32. The length of the reflex reflector 33 is preferably at least twice the interval between the spokes 31, so that the reflex reflector 33 will engage the two adjacent spokes on opposite sides of the spoke on which the reflector 33 is mounted. It will be evident from FIG. 3 that the adjacent spokes 31 prevent the reflector 33 from rotating about the spoke 31 on which the reflector is mounted.

The marker device 30 preferably comprises seat means for receiving and locating one of the spokes 31, and clamping means for clamping the seat means and the spokes together. As illustrated in FIGS. 1, 2 and 5, the seat means may comprise a groove 40 formed in at least one side of the reflector 33 and adapted to receive one of the spokes 31. In this case, the seat means also preferably comprises a wall element or lug 42 projecting from at least one side of the reflector 33. As illustrated, the groove 40 and the wall element 42 are spaced apart on the surface of the reflector 33 and are located toward the oppposite edges of the reflector. It will be seen that a portion of the spoke 21 is retained within the groove 40, with the spoke in abutment with one or both sides of the groove 40. Another portion of the spoke 31 abuts against the wall element 42.

As illustrated in FIGS. 1-6, the clamping means for the marker device 30 may take the form of a clamping screw 44, adapted to clamp the spoke 31 against the seat elements 40 and 42. The illustrated screw 44 is received by a nut 46 which is encapsulated between the two reflector plates 34. The screw 44 extends through an opening 48 which is axially aligned with the nut 46.

As shown to best advantage in FIGS. 2, 3 and 7, the nut 46 may be received and retained in complementary sockets 50 formed in bosses 52 on the rear sides of the plates 34. The sockets 50 are of a shape to correspond with the shape of the nut 46. In this cae, the nut 46 and the socket 50 are hexagonal in shape.

In the marker device 30 of FIGS. 1-7, an additional seat element 54 for the spoke 31 is provided adjacent to the clamping screw 44. The illustrated seat element 54 is in the form of a groove formed in a boss 56, projecting forwardly from the reflector 33. The boss 56 is coaxial with the opening 48 which receives the clamping screw 44.

It will be seen that the illustrated clamping screw 44 has a head 58 which is adapted to engage and clamp the spoke 31 into the grooves 40 and 54 and against the walls of the grooves. A projection 60 extends forwardly from the boss 56 for engagement by the head 58 of the screw 44 at a point diametrically opposite from the groove 54 so that the head 58 of the screw 44 will engage the spoke 31 and the projection 60 simultaneously and evenly. In this way, bending of the screw 44 is prevented.

As illustrated to best advantage in FIGS. 1 and 4, the head 58 of the screw 44 is preferably formed with one-way driving elements 62 which make it possible to tighten the screw 44 while making it difficult or impossible to loosen the screw. The illustrated driving elements 62 are formed with abutments 64 adapted to be engaged by a screwdriver when the screw 44 is tightened. The one-way drive elements 62 have sloping cams 66 which are slidably engageable by the screwdriver when an attempt is made to loosen the screw. The one-way driving elements minimize the possibility that the marking device 30 will be stolen from the bicycle.

The marker device 30 of FIGS. 1-7 is mounted on the bicycle wheel 32 by positioning the marker member or reflector 33 on the wheel 32 so that one of the spokes 31 is received in the grooves 40 and 54, while being in abutment with the wall element 42. The clamping screw 44 is then tightened by using a screwdriver in conjunction with the one-way driving elements 62. The head 58 of the screw 44 clamps the spoke 31 into the grooves 40 and 54, while producing clamping pressure between the spoke and the walls of the grooves. The clamping screw 44 retains the reflector 33 on the bicycle wheel 32 in a secure manner, so that the possibility of loss or theft is minimized.

As shown in FIG. 2, the groove 40 in the member 33 has an inclined bottom surface 64, to match the inclination of the spoke 31. The groove 54 may be similarly inclined.

It will be recalled that the reflective member 33 is illustrated as comprising two reflective plates 34, joined together back to back. The plates 34 may be identical in construction. In this way, the same mold can be employed to form both plates 34. Thus, the plates 34 may be molded from a suitable transparent resinous plastic material such as methyl methacrylate or polystyrene. The clamping screw 44 may be screwed into the nut 46 from either side of the reflective member 33.

FIG. 8 illustrates a modified marker device 70 comprising a marker member 72 which is similar to the member 33, except that the wall element 42 is not employed on the reflective member 72. The reflective member 72 has a groove 74 which corresponds to the groove 40, except that the groove 74 is angled slightly, to allow for the slight angularity of the spokes 31. The clamping screw 44 and the other elements of the marker device 70 may be the same as illustrated and described in connection with FIGS. 1–7. As before, the reflective member 72 may comprise two identical retroreflective plates joined together back to back. Thus, there is a groove 74 on both sides of the reflective member 72. The clamping screw 44 may be mounted on either side of the reflective member 72.

FIG. 9 illustrates another modified marker device 80 having a marker member 82 which may be the same as the marker member 33, except that the groove 40 is replaced with a second wall element or lug 84 which is similar to the first wall element or lug 42. The seat for the spoke 31 is formed by the wall elements 42 and 84, together with the front surface 86 of the member 82. The wall elements 42 and 84 are spaced widely apart and preferably are adjacent the opposite edges of the marker member 82.

It will be seen from FIG. 9 that the clamping screw 44 is engageable with the spoke 31 at an intermediate point, between the portions of the spoke 31 which engage the wall elements or lugs 42 and 84. In the construction of FIG. 9, the boss 56 is omitted. The groove 54 and the projection 60 are also omitted. The wall elements 42 and 84 engage one side of the spoke 31, while the other side of the spoke is engaged by the clamping screw 44. The head 58 of the screw 44 is effective to clamp the spoke 31 against the front face 86 of the reflective member 82. The wall elements 42 and 84, acting in conjunction with the clamping screw 44, maintain the desired orientation between the reflective member 82 and the spoke 31.

FIGS. 10–14 illustrate another modified marker device 90 comprising a double sided reflector or other marker member 92, similar to the marker member 33 of FIG. 1. Here again, the member 92 comprises two reflective plates 94 joined together back to back.

As before, the member 92 is provided with seat means for the spoke 31, such seat means being illustrated as comprising first and second wall elements or lugs 96 and 98, projecting from the front surface 100 of the member 92. In this case, the wall elements 96 and 98 are provided with overhanging lips or flanges 102 and 104, adapted to overhang the spoke 31 so as to confine it against the front surface 100.

The marker device 90 is provided with clamping means to act between the spoke 31 and the member 92, such clamping means being illustrated in the form of a rotatable cam or eccentric 106. It will be seen from FIGS. 10 and 11 that the illustrated cam 106 has a flat, low portion 108 which provides clearance for the insertion of the spoke 31 into the space between the cam 106 and the wall elements 96 and 98, when the cam 106 is in its released position, as shown in FIG. 10. The illustrated cam 106 has a high, generally circular portion 110 which is movable into engagement with the spoke 31 by rotating the cam 106 to its clamping position, as shown in FIG. 11. The high portion 110 of the cam 106 applies a substantial clamping force to the spoke 31 so as to clamp it against the wall elements 96 and 98. The clamping force produces flexure or resilient bending of the spoke 31, between the wall elements or lugs 96 and 98, as will be evident from FIG. 11. The spoke 31 is free to flex between the wall elements 96 and 98. The flexure of the spoke 31 produces a resilient clamping action, so that the cam 106 will not readily be loosened by vibration and shock.

Stop elements are preferably provided to limit the rotation of the cam 106 into its clamping position. As shown in FIGS. 10 and 11, the cam 106 is formed with an outwardly extending stop projection 112 which is engagable with a lug 114 projecting forwardly from the reflective member 92.

Various means may be provided to rotate the cam 110. As shown in FIGS. 10 and 11, the cam 106 is formed with a slot or recess 116 for receiving a screwdriver, which may be employed to rotate the cam.

The cam 106 is rotatably mounted on the reflective member 92. This may be accomplished in an advantageous manner, as shown to best advantage in FIGS. 12 and 14. It will be seen that the cam 106 is connected to a disc-shaped rotatable member 118 which is retained between the reflective plates 94. As shown, the plates 94 are formed with complementary sockets 120 for receiving the rotatable member 118. The sockets 120 are formed in bosses 122 on the rear or inner sides of the plates 94. A shank or shaft 124 of reduced diameter extends between the rotatable member 118 and the cam 106. The shaft 124 extends through an opening 126 in one of the plates 94. It will be understood that the rotatable member 118 may be formed as a separate piece which may be secured to the shaft 124 in any suitable manner.

If desired, the two plates 94 may be identical in construction, in that duplicate sets of the lugs 96, 98 and 114 may be formed on the two plates. Moreover, the opening 126 may be formed in both plates 94.

The marker device 90 may be mounted on the spoke 31 by inserting the spoke under the overhanging lips 102 and 104, so that the spoke is disposed against the seat afforded by the wall elements 96 and 98, in conjunction with the front surface 100 of the reflective member 92. Initially, the flat surface 108 of the cam 106 is opposite the spoke 31. To clamp the spoke 31 against the wall elements 96 and 98, the cam 106 is rotated clockwise with a screwdriver until the stop projection 112 engages the lug 114. The engagement of the curved portion 110 of the cam 106 with the spoke 31 causes the spoke to be flexed between the wall elements 96 and 98, so that a resilient clamping force is developed between the spoke and the wall elements.

FIG. 15 illustrates another modified marker device 130 which also utilizes a clamping cam 132 engageable with the spoke 31. In this case, the cam 132 is adapted to be operated by a lever 134 which may be formed integrally with cam 132. It will be seen that the cam 132 and the lever 134 are rotatab,e about a pivot in the form of a pin 136. A groove 135 is preferably formed in the cam 132 to engage and retain the spoke 31.

The marker device 130 comprises a marker member in the form of a reflector 38 which preferably comprises two reflector plates 140 and 142, welded or otherwise secured together, back to back, as before. A seat for the spoke 31 is provided by a groove 144 in the front of the plate 140, and also by a wall element 146 having an overhanging lip or flange 148. The wall element 146 projects forwardly from the plate 140.

In this case, the lever 134 is swingable into and out of a recess 150, formed in the rear side of the plate 140. The pivot pin 136 may be received in openings 152 and 154 in the plates 140 and 142.

The marker device 130 of FIGS. 15–17 may be mounted on the spoke 31 by swinging the lever 134 out of the recess 150 so that the spoke 31 can readily be inserted under the lip 148 and into the groove 144, as shown in FIG. 15. The lever 134 is then swung clockwise into its clamping position within the recess 150. It will be understood that the cam 132 has an eccentric shape so that it progressively clamps the spoke 31 against the seat provided by the groove 144, as the lever 134 is swung to its clamping position. It will be apparent that the marker device 130 of FIGS. 15–17 can readily be mounted on the spoke 31 without the use of any tools.

FIG. 18 illustrates a modified marker device 160 which is generally similar to the marker device 130 in that the marker device 160 may employ substantially the same clamping cam 132 and lever 134. However, the this case the cam 132 does not directly engage the spoke 31, but rather engages a slider 162 which is engageable with the spoke 31. The slider 162 may be made of metal or some other material which is hard enough to bite into the spoke 31, so as to produce a particularly secure clamping action. The cam 132 and the lever 134 may be made of a plastic material.

In the marker device 160 of FIG. 18, the groove 144 is not used, but is replaced by a second wall element 164 having an overhanging lip 166. The wall element 164 projects forwardly from the front of the plate 140. Otherwise, the marker device 160 may be similar to the marker device 130 of FIG. 15.

It will be seen from FIG. 18 that the slider 162 engages the spoke 31 at a point disposed between the wall element 164 and the wall element 146, which may be the same as illustrated in FIGS. 15–17. At this point, the spoke 31 is free to flex, so that the clamping action of the slider 162 produces resilient flexure of the spoke 31, as shown in FIG. 18.

FIGS. 19–23 illustrate another modified marker device 170 having clamping means in the form of a wedge 172, adapted to clamp the spoke 31 against its seat on a marker member 174. As before, the marker member 174 may comprise two reflective plates 176 and 178, secured together back to back. As shown, the seat for the spoke 31 is provided by wall elements or lugs 180 and 182, projecting forwardly from the plate 176. If desired, the second plate 178 may also have such wall elements so that the plates will be identical.

The wedge 120 is illustrated as a wedge block which is slidable in aligned openings 184 formed in the plates 176 and 178. The illustrated wedge block 172 has a slanting wedge surface 186 with lips or flanges 188 and 190 at both ends.

The marker device 170 is used by inserting the wedge block 172 into the aligned openings 184, as shown in FIG. 22. The spoke 31 is then inserted into its seat against the wall elements 180 and 182, so that the spoke is against the slanting wedge surface 186. To complete the clamping operation, the wedge block 172 is forced as far as possilbe into the aligned openings 184, so that the slanting wedge surface 186 will clamp the spoke 31 against the wall elements 180 and 182. The lip 188 overhangs and engages the spoke 31 in its clamped position.

The clamping force exerted by the wedge block 172 causes resilient flexure of the spoke 31, as illustrated in FIG. 20. The wedge block 172 engages the spoke 31 at a point disposed between the wall elements 180 and 182. At this point, the spoke 31 is free to flex. The resilience of the spoke 31 maintains the clamping forces between the spoke 31 and the wedge block 172, and also between the spoke and the wall elements 180 and 182.

The marker device 170 of FIGS. 19–23 has the advantage that it can be mounted on a spoke 31 without the use of tools, although it may be desirable in some cases to use a small hammer to tap the wedge block 172 into its clamping position.

I claim:

1. A retroreflective marker device for attachment to a wheel having a plurality of wire spokes spaced apart at predetermined intervals,
   said device comprising a retroreflective marker member having a boss projecting therefrom,
   said marker member having an opening extending into said boss with internally screw-threaded means in said opening,
   and a clamping screw movably received in said opening and engaged with said internally screw-threaded means,
   said boss having a locating groove therein disposed off center relative to said opening for receiving and retaining one wire spoke of said wheel,
   said clamping screw having a clamping head disposed opposite said groove for directly engaging said spoke and clamping said spoke into said groove to retain said marker member on said spoke.

2. A marker device according to claim 1,
   in which said marker member includes a second groove aligned endwise with said locating groove for receiving and retaining an additional portion of said spoke spaced along said spoke from said locating groove for improving the stability with which said marker device is mounted on said spoke.

3. A marker device according to claim 2,
   in which said marker member includes a wall abutment extending from said marker member for engaging said spoke at a point spaced therealong from said locating groove,
   said wall abutment and said second groove being spaced in opposite directions along said spoke from said locating groove,
   said wall abutment and said screw being disposed on opposite sides of said spoke,
   said wall abutment producing further improvement in the stability of the mounting of said marker device on said spoke.

4. A marker device according to claim 1,
   including a wall abutment extending from said marker member for engaging said spoke at a point spaced therealong from said locating groove to improve the stability of the mounting of said marker device on said spoke, said wall abutment and said clamping screw being disposed on opposite sides of said spoke.

5. A marker device according to claim 1,
in which said marker member comprises a pair of retroreflective plates secured together back to back,
said internally threaded means comprising a noncircular nut mounted between said relfective plates for receiving said clamping screw,
said retroreflective plates having complementary means forming a noncircular socket between said plates for receiving and retaining said nut against rotation.

6. A retroreflective marker device for attachment to a wheel having a plurality of wire spokes spaced apart at predetermined intervals,
said device comprising a retroreflective marker member having a front surface with an opening extending into said member,
said retroreflective marker device including internally screw threaded means in said opening,
and a clamping screw having an externally threaded shank movably mounted in said opening and engaging said internally screw threaded means,
said front surface of said retroreflective marker member being formed with first and second locating elements thereon for locating one spoke of the wheel to maintain a predetermined alignment between said member and the spoke,
said first and second locating elements being spaced apart endwise and aligned endwise for engaging first and second different portions of said spoke at points spaced along said spoke,
said clamping screw having a head on said shank for directly engaging said spoke for clamping and retroreflective marker member against said spoke,
said shank of said clamping screw being engageable on one side thereof with one side portion of said spoke,
said first and second locating elements including respective first and second wall elements engageable with the opposite side portions of said spoke to confine said spoke under said head of said screw and between said shank and said wall elements,
said clamping screw being disposed at an intermediate point between said first and second wall elements to provide clamping engagement between said head of said screw and said spoke at an intermediate point therealong between the points of engagement of said spoke with said first and second wall elements.

7. A device according to claim 6,
in which said first locating element comprises means forming a locating groove in said front surface of said member.

8. A device according to claim 6,
in which said first locating element comprises means forming a locating groove in said front surface of said member for receiving and locating said spoke,
said second locating element taking the form of a wall abutment extending forwardly from said member.

9. A device according to claim 8,
in which said shank of said screw and said wall abutment are disposed on said member in staggered positions for engaging opposite sides of said spoke.

10. A device according to claim 6,
in which at least one of said locating elements takes the form of a wall abutment extending forwardly from said front surface of said member,
said wall abutment and said shank of said clamping screw being disposed in staggered positions on said member for engaging opposite sides of said spoke.

11. A device according to claim 6,
in which said first and second locating elements take the form of respective first and second wall abutments extending forwardly from said front surface of said member,
said shank of said clamping screw and said wall abutments being disposed in staggered positions on said member for engaging opposite sides of said spoke whereby said spoke is confined between said screw and said wall abutments.

12. A device according to claim 6,
in which said retroreflective marker member comprises a pair of retroreflective plates secured together back to back,
said internally threaded means taking the form of a noncircular nut retained between said plates,
said plates having noncircular socket means therebetween for receiving and holding said nut against rotation.

* * * * *

UNITED STATES PATENT OFFICE
CERTIFICATE OF CORRECTION

Patent No. 4,037,924　　　　　　　　Dated July 26, 1977

Inventor(s)　Louis May

It is certified that error appears in the above-identified patent and that said Letters Patent are hereby corrected as shown below:

In Column 1, line 7, "reflux" should be "reflex".
In Column 1, line 59, "Thehead" should be "The head".
In Column 2, line 12, "In this cam" should be "In this case".
In Column 2, line 41, "having shown" should be "being shown".
In Column 7, line 1, "rotatab,e" should be "rotatable".
In Column 7, line 5, "reflector 38" should be "reflector 138".
In Column 7, line 33, "the this case" should be "in this case".
In Column 9, line 8, "relfective" should be "reflective".
In Column 9, line 33, "spaced along" should be "spaced apart along".
In Column 9, line 35, "clamping and" should be "clamping said".

Signed and Sealed this

Eighth Day of November 1977

[SEAL]

Attest:

RUTH C. MASON　　　　　　LUTRELLE F. PARKER
*Attesting Officer*　　　*Acting Commissioner of Patents and Trademarks*